C. N. AND F. C. BEAL.
TRACTOR DRIVING AND MECHANISM THEREFOR.
APPLICATION FILED MAR. 8, 1920.
1,423,642.
Patented July 25, 1922.
6 SHEETS—SHEET 1.
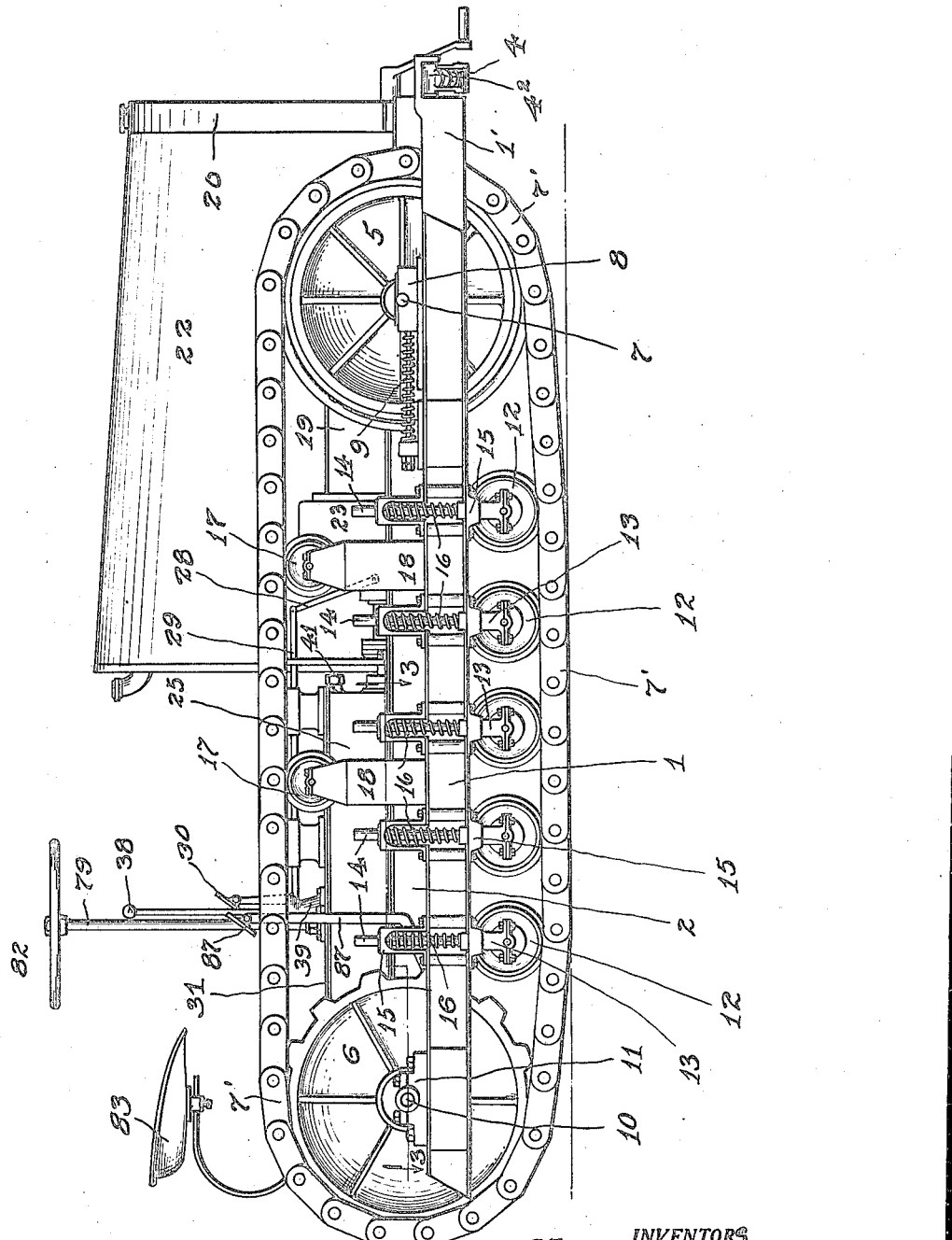

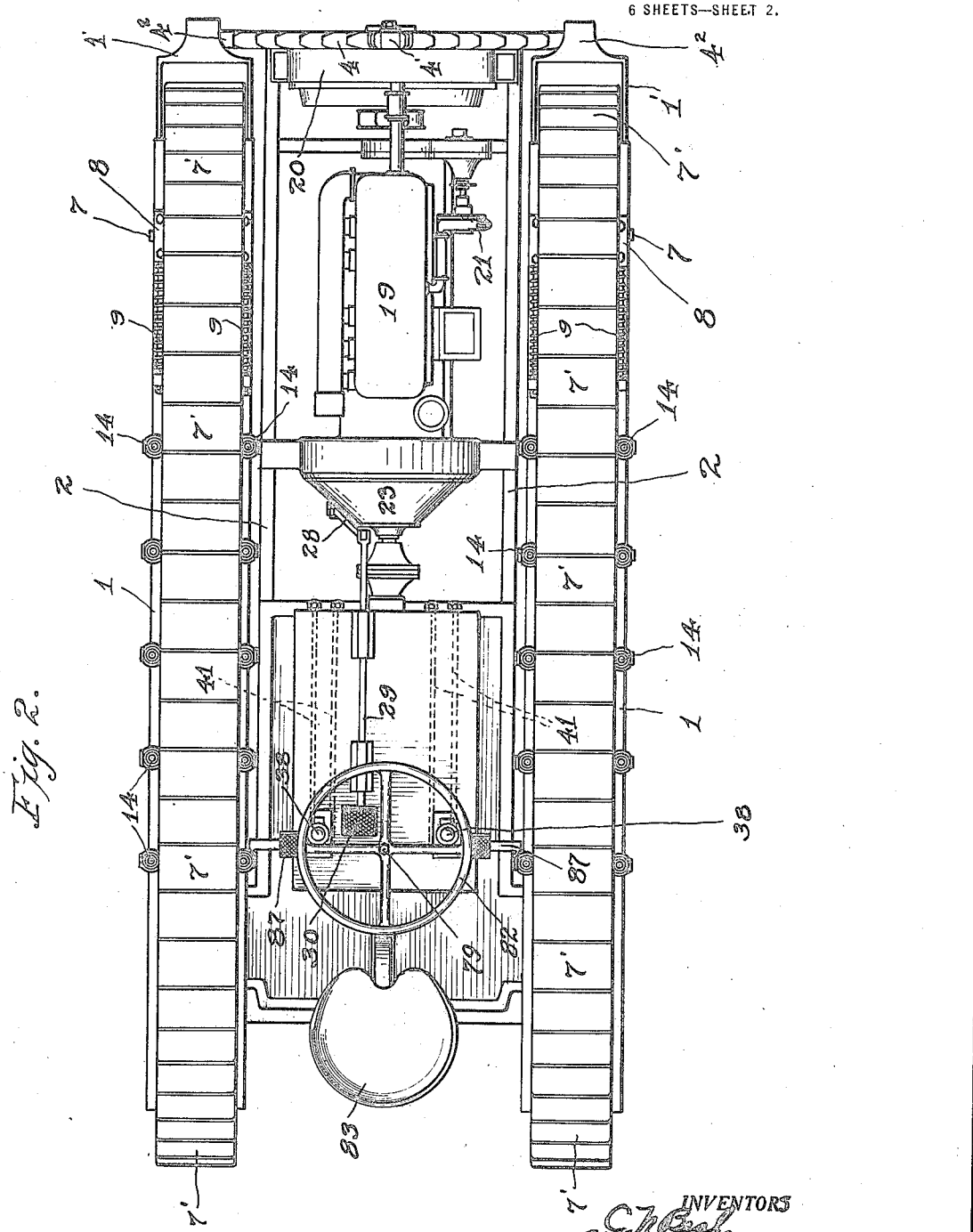

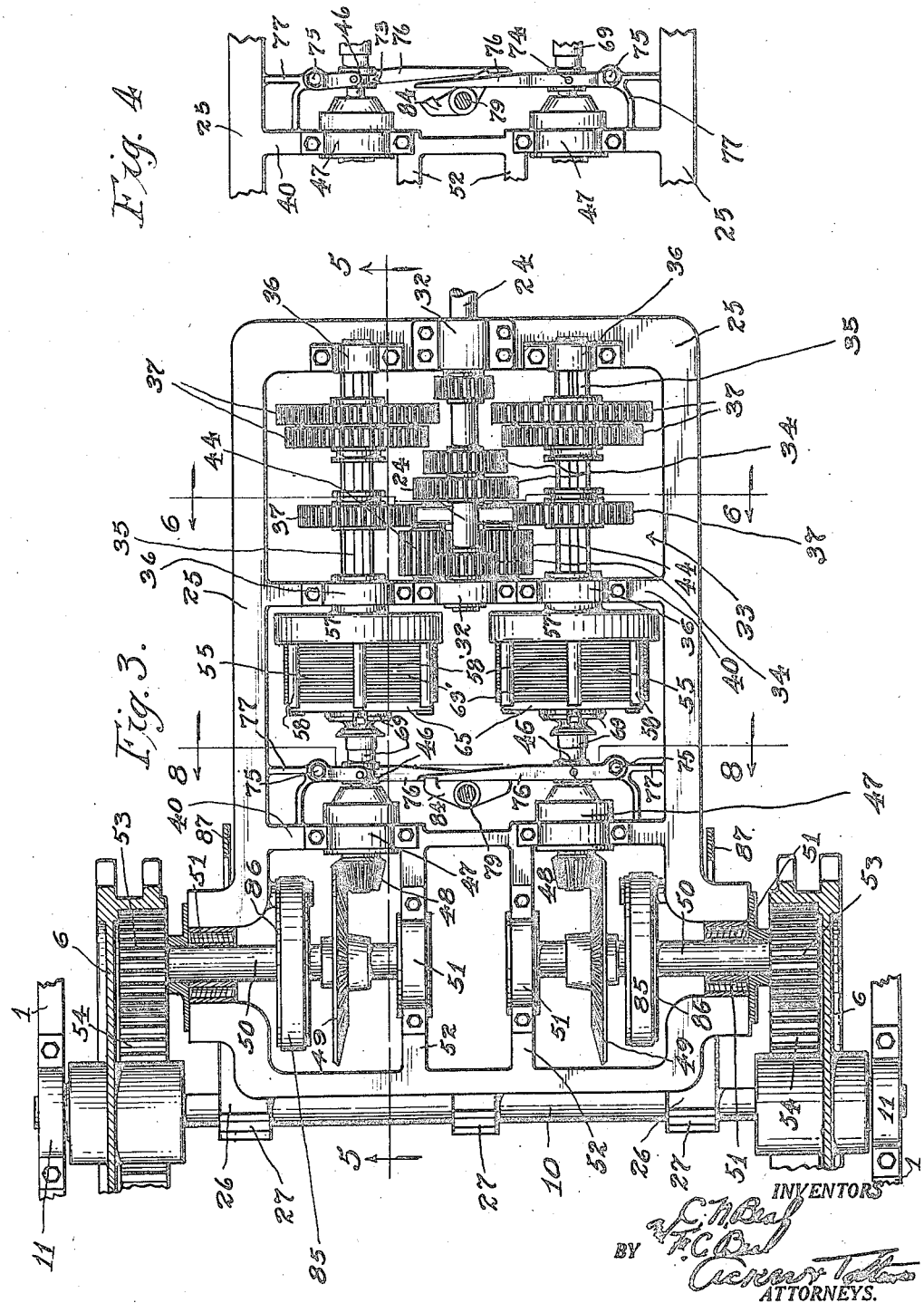

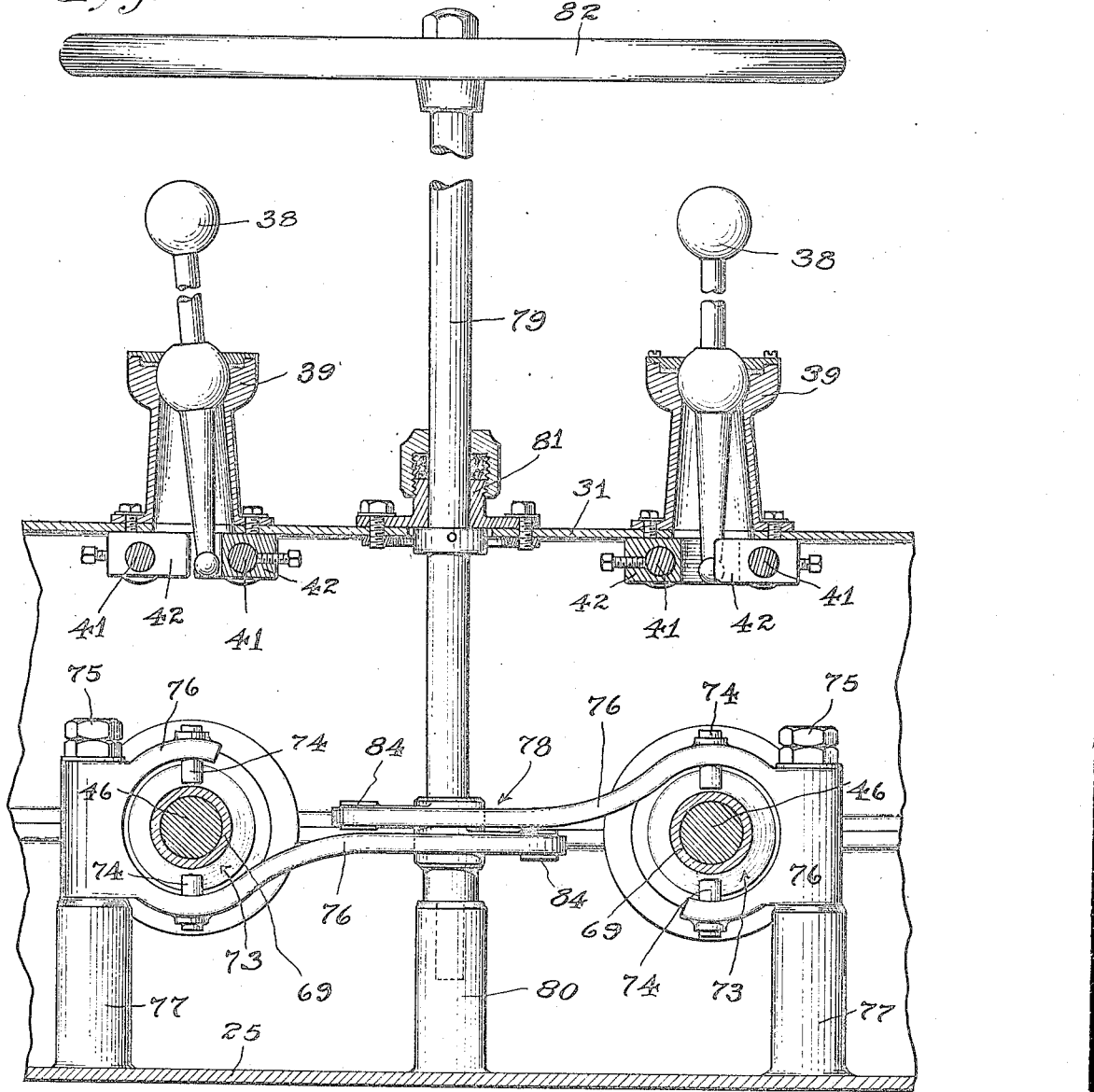

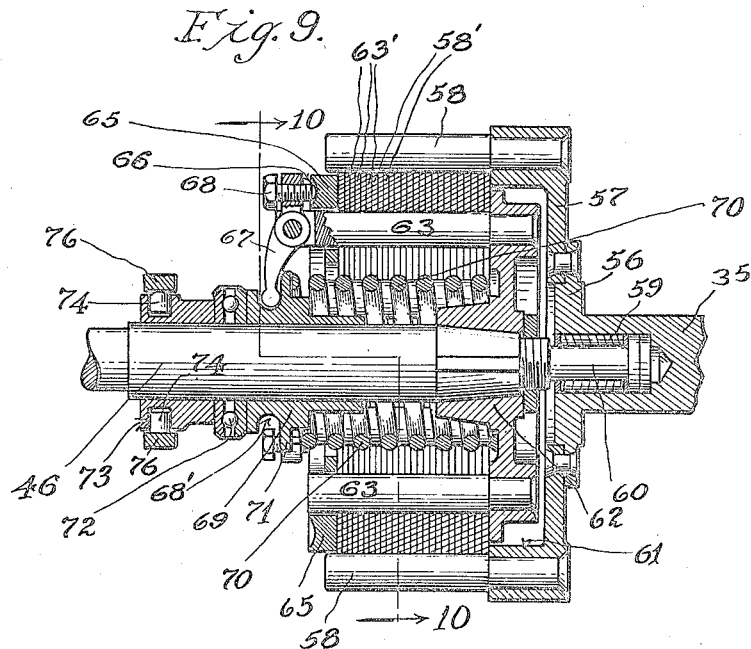
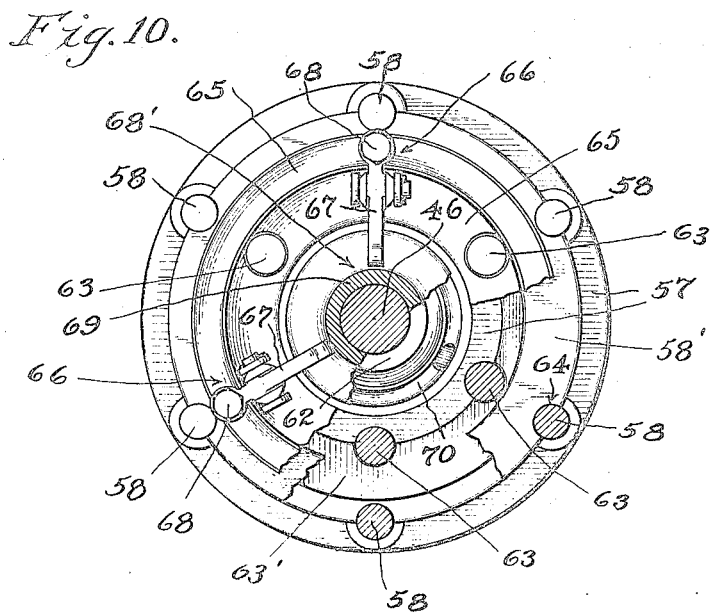

UNITED STATES PATENT OFFICE.

CARROLL N. BEAL AND FAY C. BEAL, OF SAN FRANCISCO, CALIFORNIA.

TRACTOR DRIVING AND MECHANISM THEREFOR.

1,423,642. Specification of Letters Patent. Patented July 25, 1922.

Application filed March 8, 1920. Serial No. 364,175.

*To all whom it may concern:*

Be it known that we, CARROLL N. BEAL and FAY C. BEAL, citizens of the United States, residing at the city and county of San Francisco and State of California, have invented certain new and useful Improvements in Tractor Driving and Mechanism Therefor, of which the following is a specification.

The present invention relates to improvements in tractors and more particularly to the driving thereof enabling the tractor supporting means at either side of the apparatus to be driven either forward or reverse and at any desired speed independently of the direction of travel of the opposing tractor supporting means.

The principal objects of this invention are to provide an apparatus having a steering wheel capable of operation in a manner corresponding to the steering wheels on motor driven vehicles for automatically controlling the relative speeds of opposing tractor supporting members, thereby steering the tractor by the operation of a single member; to provide in connection with the main power clutch a pair of independent variable speed power transmitting gear mechanisms each having an auxiliary or secondary clutch, whereby the driving gear ratio from the power plant to the opposing tractor members may be independently varied, and to provide a novel means for operating the auxiliary clutches whereby the maximum power is capable of being transmitted through said clutches, and at the same time enabling the clutches to be released with but little effort on the part of the vehicle operator. A further object is to provide a simple, easily operated and conveniently arranged system of control members within easy reach of the vehicle operator enabling him to control the speed and steer the vehicle with but little effort. A further object is to provide a novel sub-frame mounting for carrying the power and drive elements of the tractor whereby the same are relieved from the jar to which the main supporting frame is subjected.

With the above mentioned and other objects in view the invention consists in the novel construction and combination of parts hereinafter described illustrated in the accompanying drawings, and set forth in the claims hereto appended, it being understood that various changes in the form, proportion, size and minor details of construction within the scope of the claims may be resorted to without departing from the spirit or sacrificing any of the advantages of the invention.

To more fully comprehend the invention reference is directed to the accompanying drawings, forming a part of this application and wherein, Fig. 1 is a view in side elevation of our improved tractor.

Fig. 2 is a view in top plan of our tractor illustrating more particularly the power plant and the housing for the main clutch, the case for the independent variable speed power transmitting gear mechanism and auxiliary clutches, the steering wheel and the endless supporting tracks.

Fig. 3 is a view in plan of the variable speed power transmitting gear mechanism and auxiliary clutches with both clutches in engaged position.

Fig. 4 is a view in detail of the clutch operating levers, illustrating the steering wheel operated to release one clutch.

Fig. 8 is a transverse sectional view of the clutch operating levers and steering wheel taken on line 8—8 of Fig. 3 of the drawings, viewed in the direction of the arrows.

Fig. 9 is a longitudinal detailed sectional view of one of the auxiliary clutches.

Fig. 10 is a vertical sectional view of one of the clutches taken on line 10—10 of Fig. 9 of the drawings, viewed in the direction of the arrows.

Figure 5:
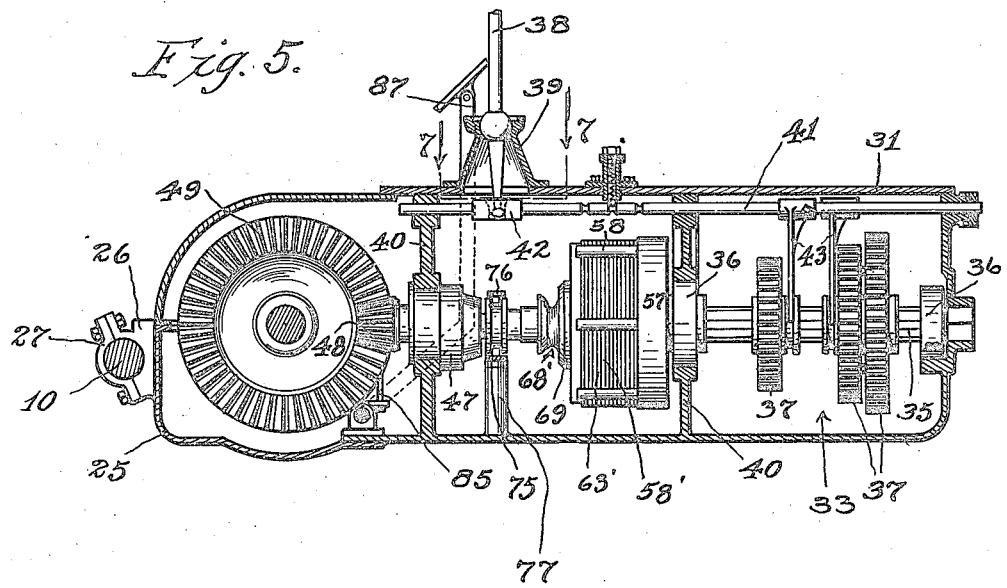
Fig. 5 is a longitudinal sectional view taken through the gear box on line 5—5 of Fig. 3 viewed in the direction of the arrows.

Referring to the drawings, wherein like characters of reference designate corresponding parts, the numeral 1 indicates the spaced channels forming side frame members at each side of the tractor and between said side frame members is positioned a sub or auxiliary frame 2, carrying the power plant and drive mechanism of the apparatus. The spaced channel members 1 forming the respective side frame members are connected at their forward ends by the yokes 1' and at their rear ends in any suitable manner. The auxiliary frame 2 is yieldably supported at its front end by a cross spring 4, secured at its center to the forward end of the sub-frame as at 4' and at its ends to the yokes 1' as at 4².

Positioned between the spaced channels 1 forming the respective side frames and arranged in pairs at opposite sides of the tractor, are the supporting wheels 5 and toothed drive wheels 6, the supporting wheels at the forward end of the tractor being rotatably mounted on axles 7, supported in bearings 8, movable longitudinally of the side frame members and normally forced forwardly by coiled springs 9, and the drive wheels 6 at the rear of the tractor rotate about a solid axle 10 secured at its ends in fixed bearings 11 carried by the side frame members. The respective pairs of drive and supporting wheels 5 and 6 mount an endless flexible track 7'; the lower flight of each tractor being maintained in contact with the ground at points between the drive and supporting wheels by the commonly termed track wheels 12, carried by the hangers 13. The hangers are provided with shafts 14 vertically movable in guides 15 in the side frame members, and the springs 16 yieldably force the track wheels 12 downwardly between the side frame member forming channels 1. As illustrated in the drawings, a plurality of track wheels are provided in the space between supporting wheels 5 and 6 at each side of the tractor to insure the greater portion of the lower flight of each tractor between the wheels 5 and 6 to be maintained in tight contact with the ground. The upper flight of the track between the driving and supporting wheels are supported by the idler wheels 17 rotatable in the upper ends of frames 18, extending upwardly from the side frame forming channel members 1, as in Fig. 1 of the drawings.

Figure 6:
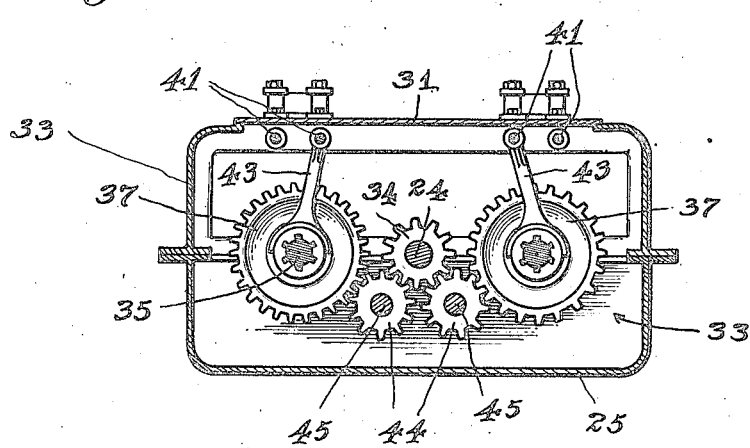
Fig. 6 is a transverse sectional view taken on line 6—6 of Fig. 3 of the drawings, viewed in the direction of the arrows.
Figure 7:
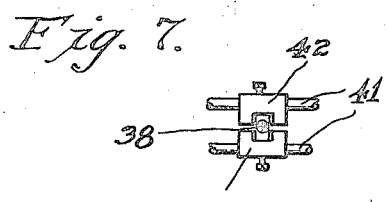
Fig. 7 is a view in detail, of one pair of shifter blocks taken on the line 7—7 of Fig. 5 of the drawings, viewed in the direction of the arrows.

Carried by the forward end of the sub-frame 2 is a suitable motor 19, of any suitable type, having the associated elements connected therewith, such as a radiator 20 and circulating pump 21, together with others not illustrated, and the motor is adapted to be enclosed by any conventional form of hood 22. With the motor-crank shaft not shown, is associated a suitable clutch, preferably of the type illustrated in Figs. 9 and 10 of the drawings, and contained within the housing 23, at the rear of the motor, and said clutch controls the transmission of power from the motor to a drive shaft 24, Figs 3 and 6 of the drawings. The drive shaft 24 extends longitudinally into the forward end of a gear case 25, secured to the sub-frame 2 and forming the rear portion thereof. The gear case at its rear end is provided with suitable axle engaging yokes 26, with which cooperate the axle straps 27, bolted thereto, and said construction provides a horizontal fulcrum about the axle 10 on which the rear end of said gear case 25 forming the rear end of the auxiliary frame 2 pivots. An operating connection for the main clutch preferably consists in a lever 28, pivotally connected through a rod 29 with an operating pedal 30 supported by the cover 31 of the gear case 25. To enable the endless tracks at opposite sides of the tractor to be independently driven in either direction at independent speeds and to enable the tractor to be steered without changing the maximum driving speed relation, we prefer to employ the following mechanism: The drive shaft 24 is rotatable in bearings 32 within the gear box 33 formed in the gear case 25, and the same carries a plurality of drive gears 34. Rotatably mounted in the gear box 33 and arranged parallel with the drive shaft 24, one positioned at each side thereof, are the independent driven shafts 35, rotatable at their ends in bearings 36 in the end walls of the gear box 33 and slidable on said respective shaft 35 and keyed to rotate therewith to transmit power thereto, from the drive shaft 24 are the driven gears 37. To selectively operate the driven gears associated with the respective driven shafts 35, we employ the shift levers 38, Figs. 1, 2 and 5 of the drawings, of the conventional ball and socket type, and one preferably positioned above each driven shaft 35 and extending into and through a support 39, carried by the gear case cover 31. The gear case is provided within its length with a plurality of transverse walls 40, and slidable transversely of the walls through openings therein and at points adjacent the open top of the gear case 25 are the shifter rods 41, Fig. 7 of the drawings, provided with the notched shifter blocks 42, of the conventional type, and from said rods extend the shift forks 43, one cooperating with each of the driven gears 37, on the respective shafts 35, thus, it will be apparent that the movement of one of the levers 38 laterally will cause a selection of the rod 41 to be operated, which in turn controls the movement of one of the gears 37 on its associated shaft 35 to move the same into or out of geared relation with the driving gears 34. The provision of two levers 38 and two sets of driven gears 37 provides a means for driving the respective driven shafts 35 at various speeds from a common drive shaft 24. Reverse pinions 44, one for engaging with the gears 37 on the respective driven shafts 35 are mounted on shafts 45 and are in mesh with one of the gears 34 of the drive shaft 24.

The respective driven shafts 35 extend rearwardly through the forward transverse wall 40 and at a point in rear of said wall are each connected with a driven connection or stub shaft 46, arranged in line with the respective driven shafts 35 and each rotatable in a bearing 47 in the rear transverse wall 40 of the gear case 25. The driven connection or stub shafts 46 each carry in their rear end a beveled pinion 48, which intermeshes with a beveled gear 49 carried by a counter-shaft 50 arranged at right angles to the stub shafts 46, and projecting at their outer ends through suitable anti-friction bearings 51 mounted in openings in the side walls of the gear case 25 adjacent its point of pivotal connection with the axle 10. The inner ends of the counter shafts 50 are rotatable in bearings 51, each mounted in the division wall 52 connecting the rear wall of the gear case 25 with the rear transverse wall 40, Fig. 3 of the drawings. Power is transmitted from the respective counter-shafts 50 to the respective toothed driving wheels 6 at each side of the tractor through a pinion 53, one associated with each counter-shaft 50 and each engaging with an internal gear 54 formed on the respective toothed drive wheels 6 as in Fig. 3 of the drawings. This construction permits of the movement of the rear end of the gear case 25 about the shaft 10 on a horizontal axis without interfering with the drive connection between the counter-shafts and the respective endless tracks at opposite sides of the track.

To steer the tractor with the least possible effort we provide a clutch 55 connecting the respective driven shafts 35 with their aligned driven connection or stub shaft 46, as illustrated in Figs. 3 and 5 of the drawings, and said auxiliary clutches like the main clutch, not illustrated, are preferably constructed in the following manner:

To the flanged end 56 of the respective shafts 35, or the main crank-shaft, is secured a driving ring 57 from one side of which extends the drive disk supporting studs 58 disposed in a plane parallel with the shaft 35 and arranged circumferentially about the same. The shaft 35 centrally of its flange 56 is provided with a bearing receiving recess 59 for containing a suitable roller bearing in which rotates the reduced spindle end 60 of the driven connection or stub shaft 46, and said stub shaft 46 mounts at a point within the overhang 61, of the driving ring 57, a driven flange 62 which also carries driven disk supporting studs 63, disposed parallel with the studs 58 and arranged concentrically within the same. Cooperating with the studs 58 are a plurality of drive clutch disks 58' formed in their periphery with notches 64 for reception in a portion of each stud 58 to insure the rotation of the disks with said studs, thus said disks are loosely positioned on the studs and are free to move longitudinally relatively thereto. Suitable driven disks 63', of a diameter falling short of the interior diameter of the circle formed by the studs 58, are positioned adjacent to the driven clutch disks 58', they like the disks 58' being provided with recesses for receiving the driven disk supporting studs 63. To obtain the maximum efficiency the drive and driven disks 58' and 63' are arranged in alternation longitudinally of their respective shafts; that is, the driven disk 63' is positioned between two driving disks 58'. The means for actuating the clutch disks is preferably constructed in the following manner:

A clutch ring 65 is positioned in contact with the outermost clutch disk adjacent the free ends of the studs 58 and 63, and the same is provided in its outer surface with a plurality of depressions 66, adjacent certain studs 63, and cooperating with these certain studs and pivotally mounted on the free ends thereof, are the levers 67, the outer free ends thereof having an adjustable screw 68 for reception in the depressions 66, and the inner ends thereof terminating short of contacting with their shafts 46 and are received in an annular groove 68' in a clutch throw-out collar 69. Tension is normally placed on the collar 69 to operate said lever 67 to normally compress the clutch plates 58' and 63' and force the same in contact with each other by means of a spring 70, coiled about the shaft 46 between the inner face of the driven flange 62 and a flange 71 on the member 69. On each shaft 46 intermediate a sliding clutch throw-out flange 71 and the member 69, is positioned a thrust bearing 72, and said clutch throw-out collars are annularly grooved as at 73 for the reception of pins 74 carried adjacent the fulcrum point 75 of the respective clutch throw-out levers 76, Figs. 3 and 4 of the drawings. The levers 76 are fulcrumed at points 75 to brackets 77 carried by the gear casing 25, and the free ends of said levers are adapted to overlap as at 78, Figs. 3, 4 and 8 of the drawings. To actuate said clutches 55 so that the same are capable of being selectively released one at a time, we prefer to use a vertically disposed axially rotatable steering post 79 resting in a bearing 80 in the base of the crank case 25 and extending upwardly through a gland 81 in the cover 31 for said gear case 25, the steering post carrying at its upper end a steering wheel 82, which preferably overlies the gear shift levers 38 and main clutch pedal 30, it being perferably in advance of the vehicle operator's seat, 83, Figs. 1 and 2 of the drawings. In the region of the overlapping free ends of the clutch release levers 76 the steering post 79 is provided with the oppositely disposed laterally extending lever releasing arms 84, arranged in different horizontal planes and one cooperating with the terminal end of each of the levers 76 at their overlapping portion 78. It will be observed that the axial rotation of the steering post in a clockwise direction will operate the lever 76 to release the clutch 55 controlling the track at the right hand side of the tractor whereby the power to drive this tractor from its associated variable speed power transmitting mechanism is interrupted without affecting the driving connection between the track at the left-hand side of the tractor and its associated variable speed power transmitting mechanism, thus the axial rotation of the steering post readily controls the steering of the vehicle through the auxiliary clutches 55 without requiring the shifting of the gears of the respective variable speed power transmitting mechanisms.

To retard the momentum of the tractor under certain conditions we provide the band brakes 85, one cooperating with a brake drum 86 associated with each countershaft 50, said band brakes being operated by suitable foot controlled levers 87 projecting upwardly from opposite sides of the gear case 25, adjacent the gear shift levers 38 and in convenient reach of the vehicle operator.

Having thus described our invention, what we claim is:

1. A tractor including a frame, supporting and drive members carried thereby and arranged at opposite sides of said tractor, a power plant including a motor, a drive shaft associated therewith, a main clutch connecting the motor and drive shaft, a pair of independent variable speed power transmissions driven by said drive shaft through said main clutch, a driving connection between said power transmissions and the driven members at opposite sides of the tractor, a secondary clutch in each of said driving connections, a lever associated with each clutch, said levers arranged with their free ends overlapping, and a single control member associated with said levers and capable of operation to selectively release said secondary clutch.

2. In a tractor a pair of supporting and driving members one located upon each side of the longitudinal axis thereof, said supporting and driving members upon one side being independent of those on the other side, a source of motive power carried by the supporting and drive members, a driven shaft associated therewith, a main clutch connecting the source of power and drive shaft, a pair of independent sliding gear variable speed power transmitting mechanisms driven by said drive shaft, a driven connection between one of said mechanisms and the supporting and drive members at one side of the tractor, a driven connection between the other mechanism and the supporting and drive members at the other side of the tractor, a secondary clutch in each of said driven connections, a rotatable steering post, laterally disposed arms carried thereby, a pair of overlapping levers one connected with each clutch and one cooperating with each arm whereby on the rotation of said post in opposite directions said secondary clutches will be selectively released one at a time.

3. In a tractor a pair of supporting and driving members one located on each side of the longitudinal axis thereof and each independent of the other, a motor carried by the tractor, means for independently controlling the operation by said motor of said supporting and driving members, the same comprising a drive shaft operated by the motor, a main clutch connecting with the motor and drive shaft, driving gears carried by said drive shaft, a pair of driven shafts associated with the drive shaft and each carrying a plurality of gears slidable thereon for selectively meshing with the driving gears, a pinion shaft associated with each driven shaft, a counter-shaft associated with each pinion shaft and driven thereby, a driving connection between each counter-shaft and one of said driving and supporting members, a secondary clutch connecting the pinion shaft with its associated driven shaft, and a means common to both of said secondary clutches for independently operating the same, said means comprising a steering collar having an extension projecting from each side thereof to operate the secondary clutches and a steering element carried by said collar.

4. A tractor including a main frame, a subframe disposed within the main frame, a spring extending across the main frame at the forward end thereof and connected at its ends with the main frame, said subframe being supported upon said spring near the center thereof, means for supporting the rear end of the subframe upon the main frame, an engine mounted upon the forward end of the subframe, driving mechanism including independently operable clutches carried at the rear of said subframe, and mechanism for operating said clutches including throw out levers adapted to overlap one another, releasing arms for engaging said levers to shift one lever when moved in one direction, and the other lever when moved in the opposite direction, and means for shifting said releasing arms.

In testimony whereof we have signed our names to this specification.

CARROLL N. BEAL.
FAY C. BEAL.